United States Patent [19]

Wolfrum et al.

[11] Patent Number: 5,300,264

[45] Date of Patent: Apr. 5, 1994

[54] PROCESS FOR THE PRODUCTION OF COMPOSITE BODIES

[75] Inventors: Christian Wolfrum, Köln; Ulrich Knipp, Bergisch Gladbach; Peter Schuster, Mannheim; Martin Brock, Neulussheim; Ronald Boot, Bensheim, all of Fed. Rep. of Germany

[73] Assignee: Bayer Aktiengesellschaft, Leverkusen, Fed. Rep. of Germany

[21] Appl. No.: 943,266

[22] Filed: Sep. 10, 1992

[30] Foreign Application Priority Data

Sep. 19, 1991 [DE] Fed. Rep. of Germany ....... 4131207

[51] Int. Cl.$^5$ .............................................. B29C 67/22
[52] U.S. Cl. ................................. 264/46.4; 264/45.1; 264/271.1; 264/300; 264/328.6
[58] Field of Search ................. 264/45.1, 279.1, 271.1, 264/328.6, 46.4, 300

[56] References Cited

U.S. PATENT DOCUMENTS

| | | |
|---|---|---|
| 3,954,926 | 5/1976 | Pahl et al. .......................... 264/46.4 |
| 4,204,051 | 5/1980 | Wellner et al. ...................... 521/121 |
| 4,446,293 | 5/1984 | Konig et al. ........................... 528/45 |
| 4,539,166 | 9/1985 | Richartz et al. ................... 264/45.1 |
| 4,571,417 | 2/1986 | Thoma et al. ........................ 525/101 |
| 4,956,240 | 9/1990 | Williams et al. ..................... 427/387 |

FOREIGN PATENT DOCUMENTS

| | | |
|---|---|---|
| 2110246 | 9/1971 | Fed. Rep. of Germany . |
| 1507433 | 4/1978 | United Kingdom . |
| 8403251 | 8/1984 | World Int. Prop. O. . |

*Primary Examiner*—Allan R. Kuhns
*Attorney, Agent, or Firm*—Joseph C. Gil

[57] ABSTRACT

A process for the production of composite bodies consisting of a polyurethane core and a polyurethane covering, with the core being positioned inside a mold so that an average distance of at least 0.5 mm exists between the surface of the core and the internal wall of the mold. The gap between the core and the internal wall of the mold is filled with a reaction mixture composed of a) a polyisocyanate component, and b) a polyol component. The polyol component b) must have a weight ratio of carbon to oxygen of at least 2.5:1.

6 Claims, No Drawings

PROCESS FOR THE PRODUCTION OF COMPOSITE BODIES

BACKGROUND OF THE INVENTION

The present invention relates to a new process for the production of synthetic resin composite parts based on polyurethane by covering a polyurethane core material which has positioned inside a mold, with a reaction mixture which reacts to form a polyurethane, the reaction mixture being based on specific polyhydroxyl compounds to optimize the bond between the two polyurethane materials. Processes for the production of synthetic resin composite parts are known.

European patent 69,076 describes in very general terms a process by which a previously produced foam core is covered with a uniform covering layer by the pressure-free introduction of a foamable mixture into an open or closed mold. The exact positioning of the core is ensured by its buoyancy. The core preferably consists of polystyrene foam while the outer layer preferably consists of chemically expanded epoxide resin. No details are given concerning the bond between the core and the covering material.

U.S. Pat. No. 3,954,926 (corresponding to German Auslegeschrift 2,127,582) describes a process by which cellular composite parts having compact, fault-free surfaces are produced by the successive introduction of several starting substances into a closed mold which has an unchangeable cavity. In this process, the substances successively introduced comprise at least a first foamable synthetic resin and a second synthetic resin which may be foamable or not and forms the surface covering under compression of the first substance.

U.S. Pat. No. 4,539,166 (corresponding to German Offenlegungsschrift 3,219,039) describes a process in which two different reaction systems are successively introduced into a mold, an internal mold release agent being added to the second substance to improve the release of the product from the mold.

It was found that problems of adherence between the inner and the outer synthetic resin layer normally arise, not only in those systems in which internal mold release agents are used but in general. These problems also occur in multilayered moldings produced entirely from polyurethane materials.

It was therefore an object of the present invention to provide an improved process for the production of composite bodies based on polyurethanes, in which the covering layer, which is preferably a light fast polyurethane, adheres firmly to the polyurethane core without any problems arising in the removal from the mold.

DESCRIPTION OF THE INVENTION

The above noted problem has been solved by the process according to the present invention.

More particularly, the present invention relates to a process for the production of composite bodies of a polyurethane core A (which may be foamed) and a polyurethane covering B, in which the core is positioned inside a mold so that an average distance of at least 0.5 mm is maintained between the surface of the core and the internal wall of the mold, and a reaction mixture of a) a polyisocyanate component having an isocyanate content of from 5 to 50% by weight, b) a polyol component having an average hydroxyl number of from 50 to 800 and optionally c) the auxiliary agents and additives known per se from polyurethane chemistry which reacts to form polyurethane covering B is introduced into the gap between the core and the internal wall of the mold, characterized in that component b) consists of at least 30% by weight of polyhydroxyl compounds in which the carbon to oxygen weight ratio is at least 3:1, and in that the carbon to oxygen weight ratio for the total quantity of component b) is at least 2.5:1.

Polyurethane core A which is positioned inside the mold consists of a solid but preferably foamed polyurethane resin whose rigidity can be adjusted to the purpose for which the composite product is to be used. The core material preferably consists of a polyurethane foam having a density range of from 50 to 900 g/cm$^3$, optionally with an integral skin, in which case the figures given for the density refer to the gross density. The core material is produced by known methods of polyurethane chemistry as described, for example, in Kunststoff-Handbuch "Polyurethane" (produced by Dr. G. Oertel), publishers: Carl Hanser Verlag, Munich, Vienna (1983). Suitable materials for the core are, for example, polyurethane resins which have been produced inside closed molds.

In the process according to the invention, the polyurethane resin core are generally positioned in a closable mold such that the average distance between the surface of the core and the internal surface of the mold is at least 0.5 mm, and preferably not less than 1.5 mm. These are average values so that areas may exist in which the gap between the core and the internal wall of the mold is less than 0.5 mm or in which the core actually makes contact with the internal wall of the mold so that the resulting molding may have areas which are not covered by polyurethane covering B.

In the process according to the invention, polyurethane covering B is prepared by the reaction of a reaction mixture of a) a polyisocyanate component, b) a polyol component and optionally c) auxiliary agents and additives.

Polyisocyanate component a) has an isocyanate content of from 5 to 50% by weight, preferably from 10 to 32% by weight. Useful isocyanates are known in the art. Suitable examples of polyisocyanates include hexamethylene diisocyanate (HDI); the isomeric xylylene diisocyanates; 4,4'-diisocyanatodicyclohexylmethane; 1-isocyanato-3,3,5-trimethyl-5-isocyanatomethylcyclohexane (IPDI); 2,4- and/or 2,6-diisocyanatotoluene; 4,4'-diisocyanatodiphenylmethane, mixtures thereof with 2,4'-diisocyanatodiphenylmethane and optionally small quantities of 2,2'-diisocyanatodiphenylmethane and/or with its higher homologs; and the like. Urethane- and/or carbodiimide-and/or uretdione- and/or isocyanurate- and/or bioret-modified derivatives of such polyisocyanates may also be used.

Polyisocyanates containing urethane, bioret, isocyanurate and/or uretdione groups and having aliphatically or cycloaliphatically bound isocyanate groups are particularly preferred. Such modified polyisocyanates are obtained, for example, from the urethanization (reaction with sub-equivalent quantities of polyhydric alcohols such as propylene glycol, trimethylolpropane and/or 2,2,4-trimethylpentanediol), biuretization, dimerization and/or trimerization of a proportion of the isocyanate groups of HDI or IPDI.

Polyol component b) has a hydroxyl number of from 50 to 800, and preferably from 95 to 600 mg KOH/G. The polyol component generally has an average hydroxyl functionality of from 2 to 8. It generally consists of a mixture of several polyhydroxyl compounds having molecular weights of from 62 to 10,000. The following are examples of suitable components of the mixture:

Low molecular weight polyols having molecular weights of from 62 to 400 optionally containing ether groups, such as ethylene glycol, propylene glycol, the isomeric butanediols, hexanediols, octanediols, trimethylolpropane, glycerol, pentaerythritol and/or sorbitol, polyethylene glycols in the aforesaid molecular weight range, polypropylene glycols in the said molecular weight range, low molecular weight propoxylation products of trimethylolpropane in the above-mentioned molecular weight range or any mixtures of such low molecular weight polyols.

Polyether polyols having molecular weights above 400, and preferably up to 10,000, in particular from 500 to 6000, such as, for example, the alkoxylation products of the above-mentioned simple polyhydric alcohols or also the alkoxylation products of water, polyamines having at least two NH bonds and/or amino alcohols having at least two active hydrogen atoms or any mixtures of such polyether polyols in the above-mentioned molecular weight range. The ethoxylation and/or propoxylation products of the starter molecules exemplified above or of mixtures of these starter molecules are particularly preferred, ethylene oxide and/or propylene oxide being optionally introduced as a mixture and/or successively into the alkoxylation reaction.

Polyester polyols of the type known from polyurethane chemistry, as obtained, for example, by the esterification of the above-mentioned simple low molecular weight polyors with polybasic acids or anhydrides of polybasic acids. Suitable acid components are, for example, adipic acid, phthalic acid, tetrahydrophthalic acid and/or hexahydrophthalic acid and the anhydrides of such acids.

Other polyol components which may be used in component b) include the hydroxyl group-containing polycarbonates and polyacetals known per se from polyurethane chemistry.

Polyol component b) preferably contains polyether polyols in the above-mentioned hydroxyl number range, optionally as mixtures with low molecular weight polyols of the type exemplified above, the divalent and/or trivalent examples being particularly preferred.

It is essential to the invention that the weight ratio of carbon present in polyol component b) to oxygen present in polyol component b) should be at least 2.5:1, preferably from 3:1 to 20:1 and most preferably from 3:1 to 10:1. This condition, which is essential for the invention, is ensured by including suitable individual components in or as the polyol b). These individual components used in a quantity of at least 30% by weight, in particular at least 50% by weight, based on the weight of component b), may be, for example, ether and/or ester group-containing derivatives of saturated and/or unsaturated alkane monocarboxylic acids having 6 to 22, preferably 12 to 18 carbon atoms, or of alkanols having 6 to 22, preferably 12 to 15 carbon atoms, which derivatives have at least two hydroxyl groups per molecule. The only precondition ensuring that such compounds are suitable is that their hydroxyl number should be from 120 to 400 and the weight ratio of carbon to oxygen should be at least 3:1, and preferably not less than 3.5:1.

These compounds are preferably hydroxy functional fatty acid esters such as, for example, glycol esters and in particular glycerol esters of hydroxy functional alkane carboxylic acids. Suitable compounds include, for example, the hydroxy functional oils and fats which occur in nature or resemble naturally occurring products, or modifications thereof prepared by chemical reactions such as hydrogenation, oxidation, transesterification, hydroformulation, amination or hydrolysis. Commercially available types of castor oil are particularly preferred.

The auxiliary agents and additives c) optionally used are those generally known in polyurethane chemistry. These may include, for example, the known catalysts for accelerating the isocyanate polyaddition reaction or the trimerization of isocyanate groups, for example, tertiary amines such as triethylamine, triethylene diamine, tin compounds such as tin(II) octoate or dibutyl tin dilaurate and Mannich bases of (i) secondary amines such as dimethylamine, (ii) aldehydes or ketones such as formaldehyde or acetone and (iii) phenols such as phenol, nonylphenol or bisphenol. Further examples of auxiliary agents and additives optionally used include blowing agents (water or low boiling inert organic liquids such as butane, pentane or hexane), emulsifiers, foam stabilizers, reaction retarders, cell regulators, stabilizers, flame retarding substances, plasticizers, dyes, fillers, drying agents (such as zeolites) and fungistatic and bacteriostatic substances.

Details concerning the use and mode of action of these additives are known and described in Kunststoff-Handbuch, Volume VII, published by Vieweg and Hochtlen, Carl-Hanser-Verlag, Munich, 1966, e.g. on pages 96 to 120.

The auxiliary agents include the internal mold release agents known per se, as described, for example, in German Offenlegungsschrift 1,953,637 (U.S. Pat. No. 3,726,952), German Offenlegungsschrift 2,121,670 (British patent 1,365,215), German Offenlegungsschrift 2 431 968 (U.S. Pat. No. 4,098,731) and in German Offenlegungsschrift 2,404,310 (U.S. Pat. No. 4,058,492). Preferred mold release agents include the salts containing at least 25 aliphatic carbon atoms of fatty acids having at least 12 aliphatic carbon atoms and primary mono-, di- or polyamines having two or more carbon atoms or amide- or ester group-containing amines having at least one primary, secondary or tertiary amino group; saturated and/or unsaturated, COOH group-containing and/or OH group-containing esters of monofunctional and/or polyfunctional carboxylic acids and polyfunctional alcohols having hydroxyl or acid numbers of at least 5; ester type reaction products of ricinoleic acid and long chain fatty acids; salts of carboxylic acids and tertiary amines; and naturally occurring and/or synthetic oils, fats or waxes.

Particularly preferred is the oleic acid or tall oil fatty acid salt of the amide group-containing amine obtained by the reaction of N-dimethylaminopropylamine with oleic acid or tall oil fatty acid or the salt of 2 mol of oleic acid and 1 mol of 1,4-diaza-bicyclo-(2,2,2)-octane.

The internal mold release agents mentioned above as examples are frequently used in quantities of up to 5% by weight, based on the weight of component b).

In the process according to the invention, the starting components are used in quantities resulting in an isocyanate index of from 80 to 2000, preferably from 80 to 150.

A comparatively large excess of component a), based on component b) may be used in particular when trimerization catalysts are used as auxiliary agent c) so that polyurethanes containing isocyanurate groups are obtained as products of the process. This variation may be used in particular when aromatic polyisocyanates a) are used but is by no means preferred.

The process according to the invention is preferably carried out in closable molds whose internal walls may be coated with an external mold release agent. Filling of the space between the polyurethane core A and the internal wall of the mold is preferably carried out by the reaction injection molding technique. The quantity and composition of the reaction mixture for producing polyurethane covering B are preferably so chosen that the polyurethane covering B has a density of from 0.8 to 1.2 g/cm³.

The hardness of polyurethane covering B may be adapted to the purpose for which the products according to the invention are to be used and may therefore lie within the wide range of from Shore A 30 to Shore D 85.

The composite bodies produced according to the invention may be used, for example, as constructional parts in the construction of motor vehicles, furniture or electrical apparatus.

All the percentages and figures given for the carbon to oxygen ratio in the following Examples refer to weight.

EXAMPLES

The mold used in the following examples was a metal mold for producing the arm rest of an office chair. A flexible or rigid polyurethane foam has been positioned and fixed in the mold as core material so that a gap of from 0.5 mm (smallest gap) to 2.5 mm (largest gap) was left between the surface of the core and the internal wall of the mold. This gap was then filled with the reaction mixture for producing polyurethane covering B by means of a high pressure dosing apparatus so that the core becomes covered with a solid covering having a density of about 1150 g/cm³.

The temperature of the raw material was about 20° to 50° C. and the temperature of the mold about 45° to 70° C. The internal wall of the mold had been coated with a commercial external mold release agent before introduction of the mixture. The residence time in the mold was 2 to 4 minutes.

The cores had previously been produced by a separate process using similar molds whose volumes were smaller by the layer thickness of the covering.

Preparation of the core material

Polyol component I was a mixture having an OH number of 170 and consisting of:
i) 31 parts by weight of a polyether polyol with OH number 28 prepared by the propoxylation of propylene glycol followed by ethoxylation of the propoxylation product (PO:EO ratio by weight=80:20),
ii) 55 parts by weight of a polyether polyol with OH number 35 prepared by the propoxylation of trimethylolpropane followed by ethoxylation of the propoxylation product (PO:EO ratio by weight 87:13),
iii) 7.9 parts by weight of ethylene glycol,
iv) 0.3 parts by weight of dibutyl tin dilaurate,
v) 0.5 parts by weight of water, and
vi) 0.3 parts by weight of a commercial polyether polysiloxane stabilizer(OS 50 of Th. Goldschmidt AG, Essen).

Polyol component 2 was a mixture having an OH number of 485 and consisting of:
i) 54.5 parts by weight of a polyether polyol with OH number 860 prepared by the propoxylation of trimethylolpropane,
ii) 40 parts by weight of a polyether polyol with OH number 42 prepared by the propoxylation of trimethylolpropane followed by ethoxylation of the propoxylation product (PO:EO ratio by weight=70:30)
iii) 3 parts by weight of dimethylbenzylamine,
iv) 0.5 parts by weight of water, and
v) 2 parts by weight of the polyether polysiloxane used for polyol component 1.

Isocyanate component 1 was a urethane group-containing polyisocyanate having an isocyanate content of 29%, prepared by the reaction of a polyisocyanate mixture of the diphenylmethane type with tripropylene glycol. The polyisocyanate mixture of the diphenylmethane type had a dinuclear content of about 80%, which in turn contained about 90% of 4,4'-diisocyanatodiphenylmethane, the remainder consisting mainly of 2,4'-diisocyanatodiphenylmethane.

Isocyanate component 2 was a polyisocyanate mixture of the diphenylmethane type having an isocyanate content of 31% and a dinuclear content of 55%, the latter containing 95% of 4,4'-diisocyanatodiphenylmethane.

Formulation 1: 100 Parts by weight of Polyol component 1 were reacted with 48 parts by weight of Isocyanate component 1 to form a flexible polyurethane foam with an integral skin (gross density =500 g/cm³).

Formulation 2: 100 Parts by weight of Polyol component 2 were reacted with 130 parts by weight of Isocyanate component 2 to form a rigid foam having an integral skin (gross density 600 g/cm³).

Preparation of Polyurethane coverings B

Polyol component 3 was a mixture having an OH number of 160, having a carbon to oxygen weight ratio of 4.2:1, and consisting of:
i) 85.5 parts by weight of castor oil (OH number 180, Carbon to oxygen ratio =4.5:1),
ii) 10 parts by weight of the polyether polyol with OH number 28 used for Polyol component 1,
iii) 4 Parts by weight of zeolite (drying agent), and
v) 0.5 parts by weight of tin diacetate.

Polyol component 4 was a mixture having an OH number of 390, having a carbon to oxygen weight ratio of 3.2:1, and consisting of:
i) 50 parts by weight of castor oil (OH number 180),
ii) 45.5 parts by weight of a polyether polyol with OH number 660 prepared by the propoxylation of trimethylolpropane,
iii) 4 parts by weight of zeolite, and
iv) 0.5 parts by weight of tin diacetate.

Polyol component 5 was a mixture having an OH number of 190, having a carbon to oxygen weight ratio of 3.2:1, and consisting of:
i) 85.5 Parts by weight of a commercial hydroxyl group containing fatty acid derivative with OH number 215 having a carbon to oxygen ratio of 3.6:1 (Sovermol POL 1012 from Henkel, Dusseldorf),
ii) 10 Parts by weight of the polyether polyol with OH number 28 used for Polyol component 1,
iii) 4 parts by weight of zeolite, and iv) 0.5 parts by weight of tin diacetate.

Polyol component 6 was a mixture having an OH number of 165, having a carbon to oxygen weight ratio of 16.1:1, and consisting of:

i) 85.5 Parts by weight of a commercial hydroxyl group containing fatty acid derivative with OH number 190 having a carbon to oxygen ratio of 17.8:1 (Sovermol 650 NS from Henkel, Dusseldorf), ii) 10 Parts by weight of the polyether polyol with OH number 28 used for Polyol component 1, iii) 4 parts by weight of zeolite, and iv) 0.5 parts by weight of tin diacetate.

Polyol component 7 was a mixture having an OH number of 190, having a carbon to oxygen weight ratio of 3.2:1, and consisting of:

i) 85.5 Parts by weight of a commercial hydroxyl group containing fatty acid derivative with OH number 220 having a carbon to oxygen ratio of 3.6:1 (Sovermol POL 1068 II from Henkel, Dusseldorf), ii) 10 Parts by weight of the polyether polyol with OH number 28 used for Polyol component 1, iii) 4 parts by weight of zeolite, and iv) 0.5 parts by weight of tin diacetate.

Polyol component 8 (Comparison) was a mixture having an OH number of 205, having a carbon to oxygen weight ratio of 1.9:1, and consisting of:

i) 80 parts by weight of a polyether polyol with OH number 250, prepared by the propoxylation of glycerol, ii) 15.5 parts by weight of the polyether polyol with OH number 28 used for Polyol component 1, iii) 4 parts by weight of zeolite, and iv) 0.5 parts by weight of tin diacetate.

Polyol component 9 (Comparison) was a mixture having an OH number of 150, having a carbon to oxygen weight ratio of 2.1:1, and consisting of:

i) 50 parts by weight of the polyether polyol with OH number 250 used for Polyol component 8, ii) 45.5 parts by weight of a polyether polyol with OH number 56 prepared by the propoxylation of trimethylolpropane, iii) 4 parts by weight of zeolite, and iv) 0.5 parts by weight of tin diacetate.

Isocyanate component 3 was a urethane group-containing polyisocyanate with an isocyanate content of 27% prepared by the reaction of IPDI with trimethylolpropane.

Isocyanate component 4 was a bioret polyisocyanate based on HDI having an isocyanate content of 23%.

Formulation 3: 100 parts by weight of Polyol component 3 and 57 parts by weight of Isocyanate component 4.

Formulation 4: 100 parts by weight of Polyol component 4 and 146 parts by weight of Isocyanate component 3.

Formulation 5: 100 parts by weight of Polyol component 5 and 68 parts by weight of Isocyanate component 4.

Formulation 6: 100 parts by weight of Polyol component 6 and 59 parts by weight of Isocyanate component 4.

Formulation 7: 100 parts by weight of Polyol component 7 and 68 parts by weight of Isocyanate component 4.

Formulation 8 (Comparison formulation): 100 parts by weight of Polyol component 8 and 72 parts by weight of Isocyanate component 4. This formulation provided for insufficient adherence between core and covering layer.

Formulation 9 (Comparison formulation): 100 parts by weight of Polyol component 9 and 155 parts by weight of Isocyanate component 3. This formulation provided for insufficient adherence between core and covering layer.

The results of the experiments are shown in the following Table.

TABLE

| Example | Core material | Covering material | Adherence between core and covering | Surface hardness (Shore A/D) |
|---|---|---|---|---|
| 1 | Formulation 1 | Formulation 3 | perfect | about 70A |
| 2 | Formulation 2 | Formulation 4 | perfect | about 75D |
| 3 | Formulation 1 | Formulation 5 | perfect | about 75A |
| 4 | Formulation 1 | Formulation 6 | perfect | about 70A |
| 5 | Formulation 1 | Formulation 7 | perfect | about 72A |
| 6 | Formulation 1 | Formulation 8 | no adherence | about 76A |
| 7 | Formulation 2 | Formulation 9 | no adherence | about 78D |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. A process for the production of composite bodies consisting of a polyurethane core and a polyurethane covering, comprising positioning said core inside a mold so that an average gap of at least 0.5 mm exists between the surface of the core and the internal wall of the mold and introducing a reaction mixture into the gap between said core and said internal wall, said reaction mixture comprising:

a) a polyisocyanate component having an isocyanate content of from 5 to 50% by weight, and b) a polyol component having an average hydroxyl number of from 50 to 800 and consisting of at least 30% by weight of polyhydroxyl compounds in which the carbon to oxygen weight ratio of the total quantity of component b), is at least 2.5:1.

2. The process of claim 1, wherein said polyisocyanate component a) consists entirely of polyisocyanates having aliphatically and/or cycloaliphatically bound isocyanate groups.

3. The process of claim 1, wherein said component b) consists to an extent of at least 50% by weight of polyhydroxyl compounds having hydroxyl numbers of from 120 to 400 and carbon to oxygen weight ratios of at least 3.5:1.

4. The process of claim 1, wherein internal mold release agents are included in said reaction mixture.

5. The process of claim 1, wherein the quantity and composition of said reaction mixture is calculated so that the covering produced from this reaction mixture will have a density of from 0.8 to 1.2 g/cm$^3$.

6. The process of claim 1, wherein the mold used is a closed metal mold and wherein the filling of the gap between the core and the internal wall of the mold is carried out by the reaction injection molding technique.

* * * * *